United States Patent
Tiwary et al.

(10) Patent No.: US 10,417,609 B2
(45) Date of Patent: Sep. 17, 2019

(54) METHOD AND SYSTEM FOR MULTI-MERCHANT PURCHASING

(71) Applicant: MasterCard Asia/Pacific Pte. Ltd., Singapore (SG)

(72) Inventors: Avyaktanand Tiwary, Haryana (IN); Ashutosh Sharan, Haryana (IN); Sheetanshu D Gupta, Jaipur Rajasthan (IN)

(73) Assignee: MASTERCARD AISA/PACIFIC PTE LTD, Singapore (SG)

( * ) Notice: Subject to any disclaimer, the term of this patent is extended or adjusted under 35 U.S.C. 154(b) by 326 days.

(21) Appl. No.: 15/168,874

(22) Filed: May 31, 2016

(65) Prior Publication Data

US 2016/0358122 A1    Dec. 8, 2016

(30) Foreign Application Priority Data

Jun. 2, 2015    (SG) ............................. 10201504311R

(51) Int. Cl.
| | |
|---|---|
| *G06Q 30/00* | (2012.01) |
| *G06Q 10/08* | (2012.01) |
| *G06Q 20/20* | (2012.01) |
| *G06Q 30/06* | (2012.01) |
| *G06Q 20/32* | (2012.01) |
| *G06Q 20/12* | (2012.01) |

(52) U.S. Cl.
CPC ........... *G06Q 10/087* (2013.01); *G06Q 20/12* (2013.01); *G06Q 20/202* (2013.01); *G06Q 20/203* (2013.01); *G06Q 20/322* (2013.01); *G06Q 20/3224* (2013.01); *G06Q 30/0633* (2013.01)

(58) Field of Classification Search
CPC ...................................................... G06Q 30/06
USPC ........................................................ 705/26.1
See application file for complete search history.

(56) References Cited

U.S. PATENT DOCUMENTS

2001/0051876 A1* 12/2001 Seigel .................... G06Q 30/02
  705/26.1
2004/0220884 A1* 11/2004 Khan ...................... G06Q 30/08
  705/80

(Continued)

*Primary Examiner* — Mila Airapetian
(74) *Attorney, Agent, or Firm* — Buckley, Maschoff & Talwalkar LLC

(57) ABSTRACT

A system for facilitating purchases from a plurality of merchants in a transport terminal comprises a database which is configured to store inventory data relating to items offered by merchants in the transport terminal, the inventory data for each item comprising a price in a first currency accepted by the corresponding merchant, and an available quantity of the item; and a booking module which is in communication with the database. The booking module is configured to: transmit, to the mobile communications device, product data indicative of an item list comprising at least one of the items, and the price in the first currency for each item; receive order data indicative of an order confirmation from the mobile communications device for at least one confirmed item of the item list, the order confirmation indicating a quantity of each confirmed item; generate, for each merchant corresponding to a confirmed item, booking data indicative of a booking message, the booking message comprising the quantity of the confirmed item; and transmit respective booking messages to respective merchants.

19 Claims, 5 Drawing Sheets

(56) References Cited

U.S. PATENT DOCUMENTS

| | | | | |
|---|---|---|---|---|
| 2006/0242027 | A1* | 10/2006 | Falic | G06Q 30/02 705/26.81 |
| 2008/0222003 | A1* | 9/2008 | Adstedt | G06Q 10/087 705/26.81 |
| 2009/0216633 | A1* | 8/2009 | Whitsett | G06Q 30/02 705/14.36 |
| 2011/0137745 | A1* | 6/2011 | Goad | G06Q 30/02 705/26.9 |
| 2013/0246303 | A1* | 9/2013 | Finck | G06Q 40/06 705/36 R |
| 2014/0089147 | A1* | 3/2014 | Herndon | G06Q 30/0635 705/28 |
| 2015/0163256 | A1* | 6/2015 | Frank | H04W 4/21 715/753 |
| 2016/0012514 | A1* | 1/2016 | Brown | G06Q 30/0635 705/26.81 |
| 2016/0189069 | A1* | 6/2016 | de Montfort Walker | G06Q 10/06312 705/5 |
| 2017/0228808 | A1* | 8/2017 | Kumar | G06Q 30/0631 |

* cited by examiner

METHOD AND SYSTEM FOR MULTI-MERCHANT PURCHASING

CROSS-REFERENCE TO RELATED APPLICATION

This application is a U.S. National Stage filing under 35 U.S.C. § 119, based on and claiming benefit of and priority to SG 10201504311 R filed Jun. 2, 2015.

BACKGROUND

The present invention relates to systems and methods for facilitating purchasing of duty-free items from multiple merchants over a communications network.

Duty-free shops are retail outlets that are exempt from the payment of certain local or national taxes and duties, provided that the goods are sold to travelers who will take them out of the country. Typically, duty-free shops are located in the international zone of international airports, sea ports, and train stations. Goods can be also bought duty-free on board some airplanes and passenger ships.

The duty-free market was worth US $32.6 billion from airport sales alone in 2011, and is growing by about 10% per year. However, duty-free shopping has yet to realize its full potential. Travelers are faced with a bewildering array of choices, with total retail stores ranging between 50 and 500 in major international airports. Furthermore, the time available for travelers to shop is, by definition, limited by the time remaining until departure and this time can be further reduced by idle time taken up by waiting in queues for immigration, security and check-in. Average wait time in these queues is about an hour.

It would be desirable to provide a means by which travelers can have increased time available for duty free shopping.

SUMMARY

A system for facilitating purchases from a plurality of merchants in a transport terminal comprises:
  a database which is configured to store inventory data relating to items offered by merchants in the transport terminal, the inventory data for each item comprising a price in a first currency accepted by the corresponding merchant, and an available quantity of the item; and
  a booking module which is in communication with the database and which is configured to:
  transmit, to the mobile communications device, product data indicative of an item list comprising at least one of the items, and the price in the first currency for each item;
  receive order data indicative of an order confirmation from the mobile communications device for at least one confirmed item of the item list, the order confirmation indicating a quantity of each confirmed item;
  generate, for each merchant corresponding to a confirmed item, booking data indicative of a booking message, the booking message comprising the quantity of the confirmed item; and
  transmit respective booking messages to respective merchants.

A computer-implemented method for facilitating purchases from a plurality of merchants in a transport terminal comprises:
  storing, in a database, inventory data relating to items offered by merchants in the transport terminal, the inventory data for each item comprising a price in a first currency accepted by the corresponding merchant, and an available quantity of the item;
  a booking module transmitting, to a mobile communications device, product data indicative of an item list comprising at least one of the items, and the price in the first currency for each item;
  the booking module receiving, from the mobile communications device, order data indicative of an order confirmation for at least one confirmed item of the item list, the order confirmation indicating a quantity of each confirmed item;
  the booking module generating, for each merchant corresponding to a confirmed item, booking data indicative of a booking message, the booking message comprising the quantity of the confirmed item; and
  the booking module transmitting respective booking messages to respective merchants.

BRIEF DESCRIPTION OF THE DRAWINGS

Embodiments of the invention will now be described, by way of non-limiting example only, with reference to the accompanying drawings in which.

DETAILED DESCRIPTION OF EMBODIMENTS

As used herein, the term "database" may refer to a body of data, a relational database management system (RDBMS), or both. A database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

Figure 1:
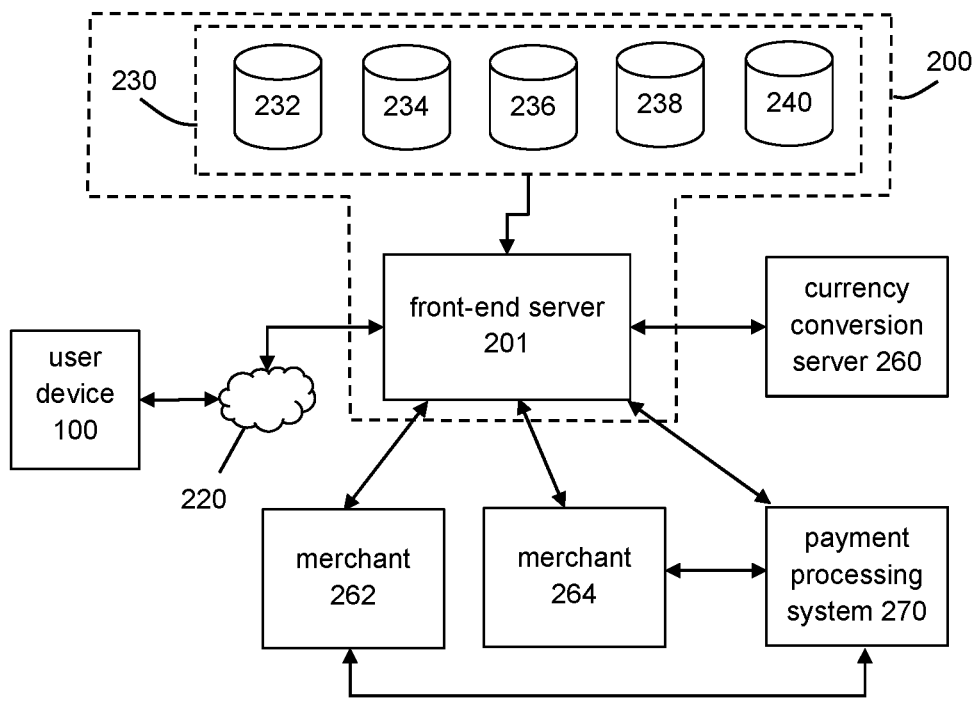
FIG. 1 is a block diagram of a system according to embodiments of the invention.

Referring to FIG. 1, there is shown an exemplary embodiment of a system 200 for facilitating purchases by a user 100 from a plurality of merchants 262, 264 located in a transport terminal such as an international airport or an international shipping terminal. Each merchant 262, 264 offers duty-free products for purchase by consumers. Two merchants are shown for illustrative purposes, but it will be appreciated that in general, a large number of merchants may be located in the transport terminal.

The system 200 comprises a front-end server 201 which is in communication with a database cluster 230. The database cluster 230 comprises a user database 232 for storing user profile information, a merchant database 234 for storing profile information concerning merchants who are registered with the system, an itinerary database 236 for storing information regarding departures from the transport terminal, and a transactions database 238 for storing a plurality of transaction records for a plurality of merchants.

The database cluster 230 may comprise one or more physical servers. In some embodiments, the databases 232, 234, 236 and 238 may be distributed over multiple devices which are in communication with one another over a communications network such as a local-area or wide-area network. For example, the itinerary database 236 may be located on an itinerary server maintained by an operator of the transport terminal, and the front-end server 201 may have authorization from the operator to access the itinerary server to retrieve data from the itinerary database. The transactions database 238 may be distributed across one or more servers of an interchange network 276 which forms part of a payment processing system 270 (FIG. 2) used by merchants 262, 264 and/or front-end server 201 to process payments of purchases made by consumers 100. The front-end server 201 may have authorization to access the transactions database 238 of the interchange network in order to retrieve transaction records, as will later be described.

The user database 232 may have stored therein a plurality of user profiles. Each user profile may comprise a user name, address, a date of birth, one or more payment card identifiers, and user preferences relating to product types, merchant types, particular merchants, and the like. The one or more payment card identifiers may be stored in encrypted form in a manner known in the art.

The merchant database 234 may have stored therein a plurality of merchant records. Each merchant record may comprise a merchant name, merchant type, transport terminal(s) in which the merchant is located, a coordinate of a physical location within each transport terminal, offers currently being provided by the merchant or which will be provided in the near future, and other information.

The itinerary database 236 may have stored therein itinerary information for a single transport terminal, or for multiple transport terminals. Each itinerary record in the itinerary database may comprise an itinerary number such as a flight number or vessel number, a departure time, a boarding time, and a location such as a gate number or berth number.

The transactions database 238 may have stored therein a plurality of transaction records relating to transactions made in a payment network using payment cards. Each transaction records may comprise type of merchant, amount of purchase, and date of purchase, as well as a time of purchase, a merchant name, a type of merchant, purchase information, cardholder account information, a type of transaction, itinerary information, information regarding the purchased item and/or service, and/or other suitable information.

The user device 100 communicates with the front-end server 201 via a communications network 220 such as the Internet. User device 100 receives input from a consumer concerning products to be purchased from duty-free merchants 262, 264, transmits the selection to the server 201, and receives pricing information for the selected products from the server 201 in a desired currency. For example, the desired currency may be selected by the consumer within a user interface of a software application (app) executing on user device 100, or may be automatically determined based on a payment card identifier (such as a credit card number) entered by the consumer or retrieved from the consumer's user profile stored in user database 232. The app executing on user device 100 may also permit the consumer to confirm one or more orders of selected products, and to transmit those orders to the respective merchants offering those products. Accordingly, the consumer may search or browse products offered by any registered duty-free merchant 262, 264 located in the transport terminal, receive pricing information in a single currency of their choice, and place orders with the duty-free merchants, all from a single interface and without needing to enter the merchant premises. This allows the consumer to carry out their duty-free shopping while, for example, waiting in a security or check-in queue.

The system 200 is in communication with a currency conversion server 260. System 200 transmits price data indicative of prices in one or more currencies, and a desired currency to which those prices are to be converted, and currency conversion server 260 performs the conversion and transmits the converted prices back to the system 200. In some embodiments, the currency conversion may be performed within system 200. For example, database cluster 230 may comprise an additional database 240 which stores up-to-date currency conversion tables for performing the conversion. System 200 may periodically update the currency conversion tables using an external data source, for example the same data source as used by currency conversion server 260.

The system 200 may communicate with merchants 262, 264, currency conversion server 260 and payment processing system 270 via the same communications network 220 by which it communicates with user device 100.

Once orders have been placed with the merchants 262, 264, the consumer may visit the physical locations of the respective merchants to complete the purchases using a payment card, for example using point-of-sale terminals of merchants 262, 264, which communicate with a payment processing system 270. Alternatively, the app executing on user device 100 may permit the consumer to complete the purchase by entering payment details, which are then used by front-end server 201 to process the payment via the payment processing system 270.

Figure 2:
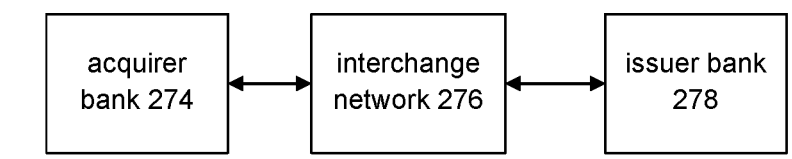
FIG. 2 shows an exemplary payment processing system usable with the system of FIG. 1.

The payment processing system 270 is shown in more detail in FIG. 2 and comprises an acquirer bank system 274, an interchange network 276 and an issuer bank system 278.

The interchange network 276 may be the MasterCard® interchange network, which is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

To process a payment associated with the payment card of consumer 100, merchant 262 or 264, or front-end server 201 (which may be in communication with a separate payment processing server, not shown), requests authorization from acquirer bank system 274 for the amount of the purchase. The request may be performed through the use of a pointof-sale terminal, which reads the cardholders account information from a magnetic stripe, a chip, or embossed characters on the payment card, or via a near-field communications (NFC) interface of the payment card, and communicates electronically with the transaction processing computers of acquirer bank system 274. Alternatively, acquirer bank 274 may authorize a third party to perform transaction processing on its behalf. Using an interchange network 276, computers of the acquirer bank 274 or the third party will communicate with computers of issuer bank 278 to determine whether the cardholders account is in good standing and whether the purchase is covered by the cardholders available credit line. Based on these determinations, the request for authorization will be declined or accepted. If the request is accepted, an authorization code is issued to merchant 262 or 264, and interchange network 276 and/or issuer bank 278 may store the transaction record in transactions database 238.

Figure 3:
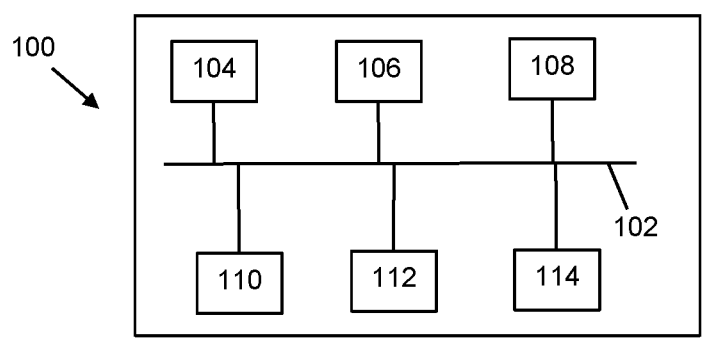
FIG. 3 is a block diagram of a user device usable with the system of FIG. 1.

An exemplary user device 100 is shown in FIG. 3. The user device is a mobile communications device such as a mobile phone, a smartphone, a tablet, a laptop, or a personal digital assistant ("PDA"). The user device 100 is arranged to receive information from and output information to a user of the user device 100. The user device 100 comprises a central processing unit ("CPU") or "processing module" 104, a touch screen 106, a memory 108 for storing data, a network interface 110, input devices such as a camera 112 and a microphone 114, and output devices such as speakers 116, all interconnected by a bus 102. The touch screen 106, memory 108, network interface 110, camera 112, microphone 114 and speakers 116 may be integrated into the user device 100 as shown in FIG. 3. In alternative user devices one or more of the touch screen 106, memory 108, network interface 110, camera 112, microphone 114 and speakers 116 may not be integrated into the user device 100 and may be connected to the CPU 104 via respective interfaces. One example of such an interface is a USB interface.

User device 100 interacts with the system 200 via processes executed by the user device 100 which are implemented in the form of programming instructions of one or more software modules or components stored on memory 108 associated with the user device 100. The software modules or components may comprise a client application such as a web browser module and/or a special purpose duty-free shopping software application ("app") for receiving input from the user, transmitting it to system 200, and receiving the results of processing from system 200 and displaying them to the user on display 106. User device 100 may also have stored, on memory 108, a number of standard modules such as an operating system (e.g., iOS or Android), and data associated with the web browser component (such as cookies or other browsing data) and/or the duty-free shopping app.

Figure 4:
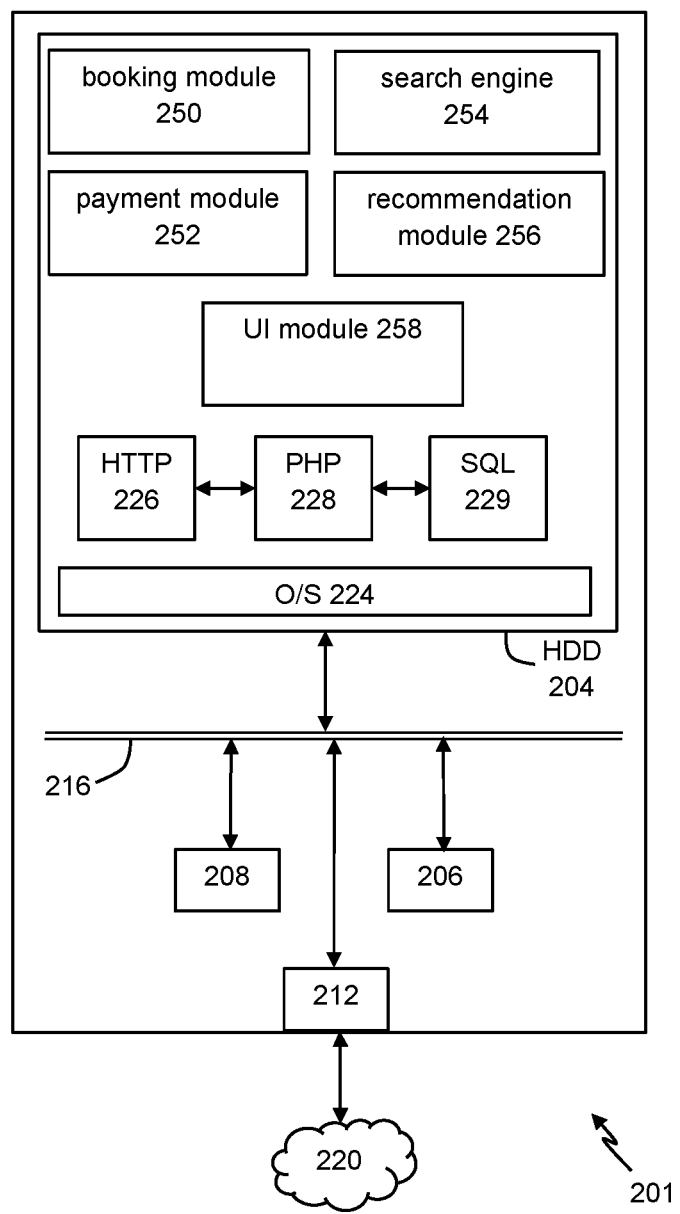
FIG. 4 is a block diagram of a front-end server of embodiments.

Turning to FIG. 4, there is shown an exemplary front-end server 201 of the system 200. In the described embodiment, the server is a standard computer system such as an Intel IA-32 based computer system 201, as shown in FIG. 4, and the associated processes executed by the system 200 are implemented in the form of programming instructions of one or more software modules or components stored on tangible and non-volatile (e.g., solid-state or hard disk) storage 204 associated with the computer system 201, as shown in FIG. 4. However, it will be apparent that the processes could alternatively be implemented, either in part or in their entirety, in the form of one or more dedicated hardware components, such as application-specific integrated circuits (ASICs), and/or in the form of configuration data for configurable hardware components such as field programmable gate arrays (FPGAs), for example.

In the presently described embodiments, the software modules comprise a booking module 250, a payment module 252, a search engine 254, a recommendation module 256, and a UI module 258, the functions of each of which will be described in more detail later.

As shown in FIG. 4, the system 201 includes standard computer components, including random access memory (RAM) 206, at least one processor 208, and external interfaces 210, 212, all interconnected by a bus 216. The external interfaces may include universal serial bus (USB) interfaces 210, for example, and a network interface connector (NIC) 212 which connects the system 200 to a communications network 220 such as the Internet.

The system 201 also includes a number of standard software modules, including an operating system 224 such as Linux or Microsoft Windows, web server software 226 such as Apache, available at http://www.apache.org, scripting language support 228 such as PHP, available at http://www.php.net, or Microsoft ASP, and structured query language (SQL) support 229 such as MySQL, available from ht//www.mysql.com, which allows data to be stored in and/or retrieved from databases 232, 234, 236 and 238, for example.

Together, the web server 226, scripting language 228, and SQL modules 229 may provide the system 201 with the general ability to allow client computing devices 100 equipped with standard web browser software to access the system 201 and in particular to provide data to and receive data from the user database 232. However, it will be understood by those skilled in the art that the specific functionality provided by the system 201 to such users may be provided by scripts accessible by the web server 226, including the software modules 250, 252, 254, 256 and 258, and also any other scripts and supporting data, including markup language (e.g., HTML, XML) scripts, PHP (or ASP), and/or CGI scripts, image files, style sheets, and the like.

Figure 5:
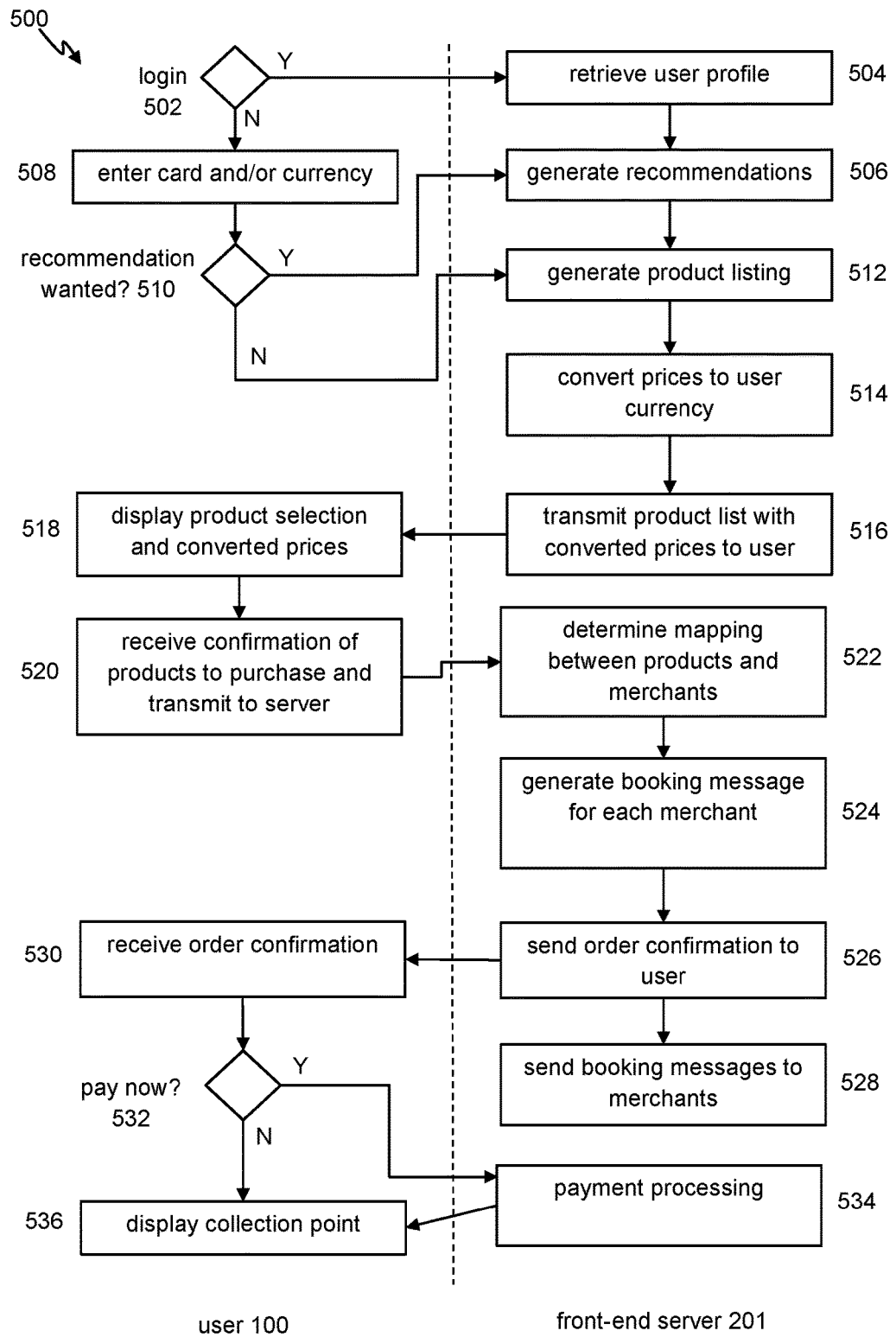
FIG. 5 is a flow diagram of a method for facilitating purchases from a plurality of merchants in a transport terminal according to embodiments.

Referring now to FIG. 5, there is shown an exemplary process 500 for facilitating purchases from a plurality of duty-free merchants located in a transport terminal.

At step 502, a consumer at user device 100 logs in to a previously established account at server 201, using a client application (such as the web browser component or duty-free shopping app) executing on user device 100. The client application sends, over communication network 220, the consumer's login details to UI module 258, which authenticates the login details against user records stored in user database 232. If the user is not found, UI module 258 may generate a prompt for the user 100 to create an account, or to proceed as a guest user. If authentication is successful then UI module 258 may retrieve the user's profile from user database 232 (step 502), and proceed to recommendation process 506.

If at step 502 the user does not wish to login and instead wishes to proceed as a guest user, the user device 100 may accept input at step 508 relating to a payment card identifier, such as a card number, and/or a desired currency that the user wishes prices of products to be displayed in. For example, if only a card number is entered, server 201 may receive the card number, parse the card number to determine the Bank Identification Number (BIN) of the card, and query a BIN database to determine the country of the issuing bank and therefore the currency of the account to which the card is linked, which may be set as the desired currency.

UI module 258 may generate and transmit a prompt to user device 100 for the user to enter itinerary data relating to the user's travel itinerary. For example, the user may be prompted to enter, via a user interface of user device 100, a flight number, date and time. The user may also be prompted to enter a destination, or this may be automatically retrieved based on the flight number. In some embodiments, the system 201 may check the flight number to ensure that it is valid, before permitting the user to continue shopping.

After step 508, the client application executing on user device 100 may prompt the user as to whether they wish to receive product or merchant recommendations. If yes, the process proceeds to step 506; otherwise, it proceeds directly to step 512, where UI module 258 generates a product listing.

The product listing may comprise all products offered by all merchants in the transport terminal, as retrieved by UI module 258 from merchant database 234, for example. The UI module 258 may receive, from the user device 100, geolocation data (for example, GPS data or a location derived from a WiFi or mobile base station to which the user device 100 is connected) in order to determine, based on the geolocation of the user, the nearest transport terminal, and thereby determine which merchants/products to display. In some embodiments, the name of the transport terminal may be received as input from the user. The product listing may be served as a page to user device 100 for browsing by the user. Alternatively, the UI module 258 may receive from user device 100 a search request for a particular product or merchant, in which case it may invoke search engine 252 in order to retrieve all matching products/merchants from the merchant database 234, and serve a page containing the search results to user device 100. In either case, at step 512, prices for the products are obtained from merchant database 234. At step 514, those prices are converted by transmitting the price data, a first currency corresponding to the currency in which the prices are stored in merchant database 234, and a second currency corresponding to the user's desired currency, to currency conversion server 260, where they are converted to the second currency and then transmitted back to the server 201. UI module 258 then generates (step 516) a page comprising the product list with corresponding converted prices, and serves the page to user device 100 where it is displayed (step 518). Instead of being converted at currency conversion server 260, the prices may be converted from the first currency to the second currency using a conversion table, such as that stored in currency database 240, for example.

At step 506, recommendation module 256 may generate, based on the user's profile and/or browsing data (such as web browser data, or browsing activity recorded by the duty-free shopping app) transmitted from user device 100 to server 201, recommended products available within the transport terminal and/or recommended merchants located within the transport terminal. The recommendations may be made at least partly on the basis of which merchants are providing special offers.

Figure 6:
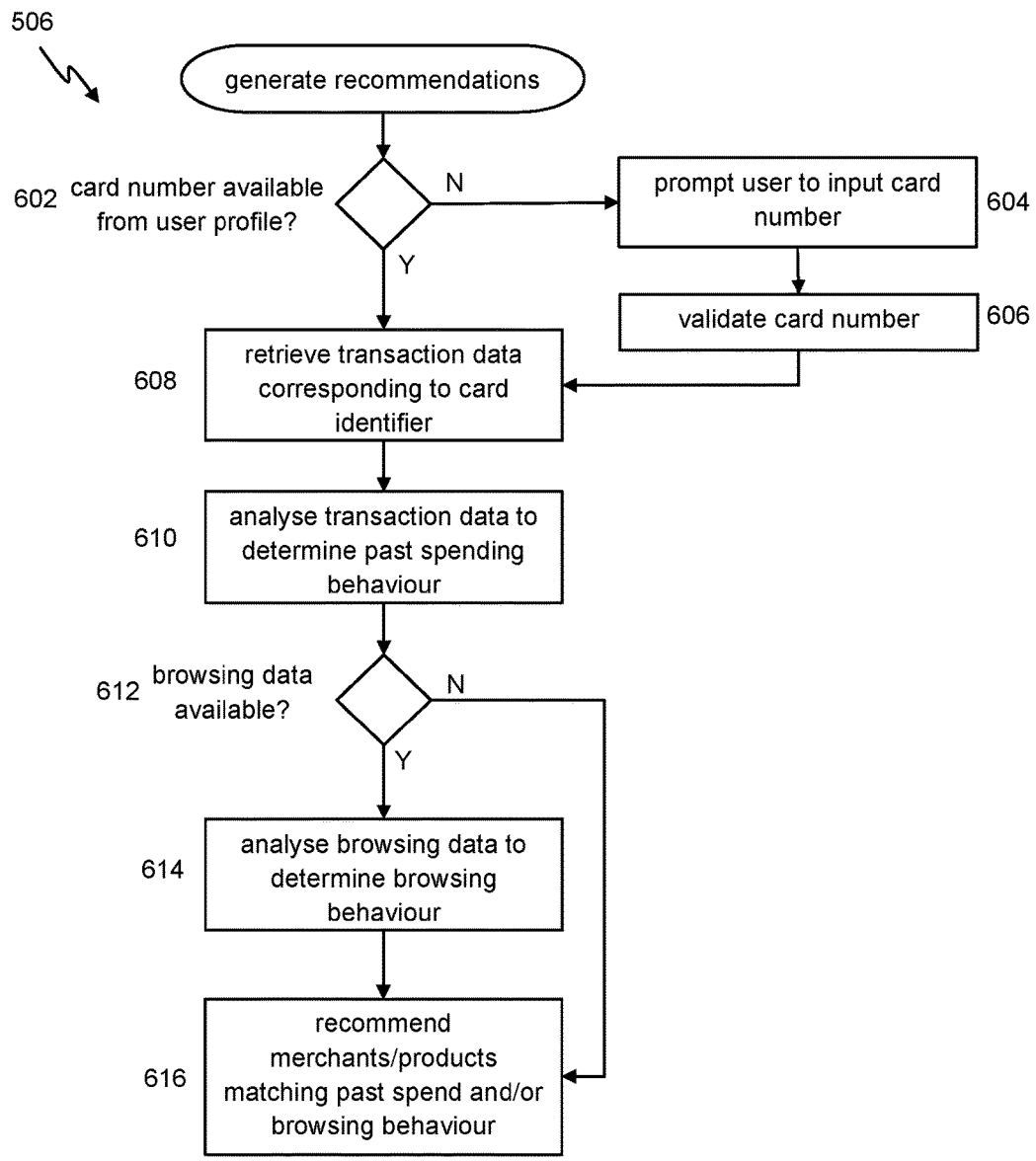
FIG. 6 is a flow diagram of a recommendation process of the method of FIG. 5.

Recommendation process 506 is shown in more detail in FIG. 6. At step 602, the recommendation module 256 checks whether a payment card number or other payment card identifier is available in the user profile. If it is not available, recommendation module 256 invokes UI module 258 to prompt the user to input a card number (step 604). If a card number is received it is checked to determine whether it is valid (step 606). Once a valid card number is received, recommendation module 256 queries the transactions database 238 to retrieve transaction records corresponding to the card number (step 608). In some embodiments, the UI module 258 may provide an option for the user not to enter a card number, in which case the recommendation process 506 may terminate without generating any recommendations.

Next, at step 610, the recommendation module 256 analyses the transaction records to determine past spending behaviour of the user. For example, the recommendation module 256 may determine, from the transaction records, which type(s) of merchant or which particular merchant(s) the user has made the most purchases (or the purchases with the highest total value) from in a predetermined period (e.g., the past 12 months, the past 6 months, the past month, etc.).

At step 612, the recommendation module 256 may perform a check to see whether any browsing data have been received from the user device 100. Browsing data 612 may not be available if certain privacy settings have been activated at user device 100. This might mean, for example, that no web browser history (or that browsing history recordal in the duty-free shopping app is switched off) and/or cookies are stored, or that even if they are stored that the device 100 does not have permission to transmit browsing data to other devices.

If browsing data are available, then at step 614 the recommendation module 256 analyses the browsing data to determine browsing behaviour of the user, and to infer from that a type of merchant, a particular merchant or a type of product which is of interest to the user. For example, the browsing data may be analysed by recommendation module 256 in order to determine which industries and product types have been viewed by the user. For example, a filtering process (e.g., a collaborative filter, a content-based filter, or a hybrid collaborative/content-based filter) may be applied to the browsing behaviour of a particular user, using browsing data collected from a plurality of other users, in order to make product recommendations for that user. If no browsing data are available, process 506 proceeds to step 616.

At step 616, recommendation module 256 determines, based on the past spend and/or browsing behaviour of the user 100, recommended merchants and/or products. In one example, the recommendation module 256 may use both transaction data and browsing data in a filtering process (e.g., a collaborative filter). In another example, recommendation module 256 may, based on a particular merchant or type of merchant identified at step 610 and/or step 614, query the merchant database 234 to locate all registered merchants within the transport terminal which are of the same type. The merchants may then be passed to UI module 258. In some embodiments, the recommendation module 256 may further analyse the records for the identified merchants to determine whether they are currently providing any special offers (for example, a discount for payment cards issued by a particular issuing bank or used on a particular interchange network), and if so, restrict the recommendations to those merchants, or rank them more highly than those which are not providing any special offers. In another example, the recommendation module 256 may, based on a particular product or type of product identified at step 610 and/or step 614, query the merchant database 234 to locate all merchants in the transport terminal who offer that product or type of product, optionally also checking whether those merchants are providing any special offers, before passing the recommended merchants to UI module 258.

Returning to FIG. 5, once one or more recommended merchants and/or products are identified by recommendation process 506, UI module 258 may generate a product listing, at step 512. The product listing may comprise all products offered by the recommended merchants, all recommended products, all products on which special offers are current, or all products of merchants who are providing at least one special offer, for example. The product listing may form part of a page which is generated by UI module 258 (following conversion of the product prices from their values in merchant database 234 to the desired currency of the user, as determined directly from the user profile or indirectly from the user's card number, for example) and served to device 100, which displays the product listing at step 518.

At step 520, user device 100 receives a selection from the user of one or more products in the list of displayed products, for example by the user touching, clicking or otherwise interacting with one or more selection control elements displayed on device 100 and associated with the displayed products. The selection control elements may comprise a quantity indicator which can be interacted with by the user to select a quantity of the selected product. Once the product selection is received, and transmitted to server 201, booking module 250 receives the product selection and determines at step 522, from the product selection, which merchants should receive pre-order messages from the user 100. For example, each product may be associated with a merchant name or merchant identifier, and the booking module 250 may group products and product quantities by merchant name or merchant identifier.

For each merchant identified at step 522, a booking message comprising a product identifier (such as a product code, SKU, etc.) and a product quantity for each selected product is generated by booking module 250, at step 524. Next, an confirmation message is generated by booking module 250 at step 526. The order confirmation comprises a summary of the order, for example a name of each merchant, a listing of products (and product quantities) corresponding to each merchant and their corresponding currency-converted prices, and a total cost of the order. The order confirmation may also provide a location within the transport terminal of each merchant listed in the order, for example obtained by booking module 250 from merchant database 234. The order confirmation message may be sent at step 526 to user device 100 by any suitable means, for example by email, SMS, instant message, or another messaging service. Additionally, at step 528, the booking messages may be sent by booking module 250 to the respective merchants 262, 264, etc., for example by email, SMS, instant message and the like.

In some embodiments, the booking module 250 may check the items in the order against one or more limitations on duty-free goods. The limitations may be stored in merchant database 234, for example. In one example, the booking module 250 determines the destination country of the user (via the entered destination or the destination automatically retrieved based on other intinerary information), queries the merchant database 234 to determine whether any limitations are in place on the items on the order, and send an alert to the user device 100 if any part of the order exceeds one of the limitations. For example, if the destination is India and more than 2 litres of alcohol are in the order, an alert may be sent to the user device 100 with a prompt to reduce the alcohol component of the order.

Once the order confirmation message is received by user device 100 at step 530, the client application executing on user device 100 may prompt the user as to whether they wish to pay for the order at that point. If yes, then process 500 proceeds to payment processing step 534. Payment module 252 may prompt the user for itinerary identification information (such as a flight number or vessel number and/or a departure time) and on receiving and authenticating the itinerary identification, may receive the total value of the order, and request authorisation of a transaction for that amount via payment processing system 270. Alternatively, payment module 252 may communicate with individual merchant systems 262 and 264 such that the individual merchant systems 262 and 264 can request, via payment processing system 270, authorisation for respective transactions for the respective subtotals within the order. If the transaction is handled centrally by payment module 252, payment module 252 may send a payment confirmation message to each merchant once the transaction has been authorised.

If the user does not wish to pay for the order at step 532, then the client application executing on user device 100 may display a collection point or collection points for the products. Since no payment has been made yet, this will typically be the respective physical locations of the merchants. If payment has been made at step 534, then the displayed collection point may be a designated central collection point within the transport terminal, or a collection point adjacent the gate or berth corresponding to the itinerary identification provided by the user at step 534. Alternatively, a separate collection point for online orders may be established by each merchant.

In some embodiments, the user of user device 100 may be prompted to download the duty-free shopping app when connected to a mobile base station at or near the transport terminal, or a wireless router located within the transport terminal. For example, a location detected by the mobile base station or wireless router may be transmitted to an application download server, which in turn generates the prompt on the user device 100. The prompt may contain a link to a download location such as a URL, for example.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A system for facilitating purchases from a plurality of merchants in a transport terminal, comprising:
   a database which is configured to store inventory data relating to items offered for purchase by merchants in the transport terminal, the inventory data for each item comprising a price in a first currency accepted by the corresponding merchant, and an available quantity of the item;
   an itinerary database storing itinerary information for at least one transport terminal, wherein each itinerary record in the itinerary database comprises an itinerary number and at least one of: a departure time, a boarding time, and a location for departure or boarding from the transport terminal, wherein the itinerary number is associated with a transportation element that provides transportation from the transport terminal;
   a booking module which is in communication with the database and the itinerary database and which is configured to:
   transmit, to a user mobile communications device, product data indicative of an item list comprising at least one of the items, and the price in the first currency accepted by the corresponding merchant for each item;
   receive order data indicative of an order confirmation from the mobile communications device for at least one confirmed item of the item list, the order confirmation indicating a quantity of each confirmed item;
   determine the order is valid based on the itinerary information;
   generate, for each merchant corresponding to a confirmed item, booking data indicative of a booking message, the booking message comprising the quantity of the confirmed item; and
   transmit respective booking messages to respective merchants.

2. A system according to claim 1, wherein the booking module is further configured to: receive data indicative of a selection of a second currency; transmit data indicative of the price in the first currency of each item and the second currency to a currency conversion server; receive, from the currency conversion server, data indicative of a price of each item in the second currency; and transmit data indicative of the price of each item in the second currency to the mobile communications device.

3. A system according to claim 1, wherein the booking module is further configured to transmit, to the mobile communications device, location data indicative of a location of each merchant corresponding to said confirmed item or items.

4. A system according to claim 1, further comprising a payment module which is configured to: receive, from the mobile communications device, card data corresponding to a payment card; and transmit, to a payment processing network, the card data and a merchant identifier for each merchant corresponding to said confirmed item or items.

5. A system according to claim 4, wherein the booking module is further configured to receive data indicative of a payment confirmation from the payment module, and to transmit, to the mobile communications device, data indicative of a location of a collection point for retrieving the confirmed item or items.

6. A system according to claim 1, wherein the database further comprises offer data relating to offers provided by at least some of the plurality of merchants, and wherein the system further comprises a recommendation module which is configured to receive user profile data relating to web browser activity and/or past spending activity of a user of the mobile communications device; and based on said user profile data and said offer data, generate, and transmit to said mobile communications device, data indicative of at least one recommended offer.

7. A system according to claim 6, wherein the recommendation module is configured to: receive, from the mobile communications device, data indicative of a payment card identifier; query, using the payment card identifier, a transactions database to identify transactions corresponding to the payment card; and determine, based on the identified transactions, at least one criterion for generating the at least one recommended offer.

8. A system according to claim 7, wherein the at least one criterion comprises an industry or market segment of a merchant providing the at least one recommended offer.

9. A computer-implemented method for facilitating purchases from a plurality of merchants in a transport terminal, comprising:
   storing, in a database, inventory data relating to items offered for purchase by merchants in the transport terminal, the inventory data for each item comprising a price in a first currency accepted by the corresponding merchant, and an available quantity of the item;
   storing in an itinerary database storing itinerary information for at least one transport terminal, wherein each itinerary record in the itinerary database comprises an itinerary number and at least one of: a departure time, a boarding time, and a location for departure or boarding from the transport terminal, and wherein the itinerary number is associated with a transportation element that provides transportation from the transport terminal;
   a booking module transmitting, to a user mobile communications device, product data indicative of an item list comprising at least one of the items, and the price in the first currency accepted by the corresponding merchant for each item;
   the booking module receiving, from the mobile communications device, order data indicative of an order confirmation for at least one confirmed item of the item list, the order confirmation indicating a quantity of each confirmed item;
   the booking module determining the order is valid based on the itinerary information;
   the booking module generating, for each merchant corresponding to a confirmed item, booking data indicative of a booking message, the booking message comprising the quantity of the confirmed item; and
   the booking module transmitting respective booking messages to respective merchants.

10. A computer-implemented method according to claim 9, further comprising receiving, at the booking module, data indicative of a selection of a second currency; transmitting data indicative of the price in the first currency of each item and the second currency to a currency conversion server; receiving data indicative of a price of each item in the second currency; and transmitting, by the booking module, data indicative of the price of each item in the second currency to the mobile communications device.

11. A computer-implemented method according to claim 9, wherein the booking module transmits, to the mobile communications device, location data indicative of a location of each merchant corresponding to said confirmed item or items.

12. A computer-implemented method according to claim 9, comprising receiving, at a payment module from the mobile communications device, card data corresponding to a payment card; and transmitting, from the payment module to a payment processing network, the card data and a merchant identifier for each merchant corresponding to said confirmed item or items.

13. A computer-implemented method according to claim 12, wherein the booking module receives data indicative of a payment confirmation from the payment module, and transmits, to the mobile communications device, data indicative of a location of a collection point for retrieving the confirmed item or items.

14. A computer-implemented method according to claim 9, wherein the database further comprises offer data relating to offers provided by at least some of the plurality of merchants, and wherein the method further comprises receiving, at a recommendation module, user profile data relating to web browser activity and/or past spending activity of a user of the mobile communications device; and wherein the recommendation module generates, based on said user profile data and said offer data, and transmits to said mobile communications device, data indicative of at least one recommended offer.

15. A computer-implemented method according to claim 14, wherein the recommendation module receives, from the mobile communications device, data indicative of a payment card identifier; queries, using the payment card identifier, a transactions database to identify transactions corresponding to the payment card; and determines, based on the identified transactions, at least one criterion for generating the at least one recommended offer.

16. A computer-implemented method according to claim 15, wherein the at least one criterion comprises an industry or market segment of a merchant providing the at least one recommended offer.

17. A non-transitory computer readable medium having stored therein instructions that when executed cause a computer to perform a method for facilitating purchases from a plurality of merchants in a transport terminal, the method comprising:

storing, in a database, inventory data relating to items offered for purchase by merchants in the transport terminal, the inventory data for each item comprising a price in a first currency accepted by the corresponding merchant, and an available quantity of the item;

storing in an itinerary database storing itinerary information for at least one transport terminal, wherein each itinerary record in the itinerary database comprises an itinerary number and at least one of: a departure time, a boarding time, and a location for departure or boarding from the transport terminal, and wherein the itinerary number is associated with a transportation element that provides transportation from the transport terminal;

transmitting, to a user mobile communications device, product data indicative of an item list comprising at least one of the items, and the price in the first currency accepted by the corresponding merchant for each item;

receiving, from the mobile communications device, order data indicative of an order confirmation for at least one confirmed item of the item list, the order confirmation indicating a quantity of each confirmed item;

determining the order is valid based on the itinerary information;

generating, for each merchant corresponding to a confirmed item, booking data indicative of a booking message, the booking message comprising the quantity of the confirmed item; and transmitting respective booking messages to respective merchants.

18. A system according to claim 1 wherein the booking module is further configured to:
check each item in the order confirmation to determine whether an item limitation is applicable.

19. A system according to claim 18, wherein the item limitation is based on a destination country of the user indicated in the itinerary information, and the item is offered by the merchant at the transport terminal.

* * * * *